(12) United States Patent
Kohno

(10) Patent No.: US 7,440,595 B2
(45) Date of Patent: Oct. 21, 2008

(54) METHOD AND APPARATUS FOR PROCESSING IMAGES

(75) Inventor: Akihiro Kohno, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 848 days.

(21) Appl. No.: 10/720,038

(22) Filed: Nov. 20, 2003

(65) Prior Publication Data

US 2004/0119839 A1  Jun. 24, 2004

(30) Foreign Application Priority Data

Nov. 21, 2002  (JP) .............................. 2002-338107

(51) Int. Cl.
*G06K 9/00* (2006.01)
(52) U.S. Cl. .................................... 382/118
(58) Field of Classification Search ................. 382/219
See application file for complete search history.

(56) References Cited

U.S. PATENT DOCUMENTS 5,828,769 A * 10/1998 Burns ......................... 382/118

6,181,805 B1 * 1/2001 Koike et al. ................. 382/118
6,400,853 B1 * 6/2002 Shiiyama .................... 382/305

FOREIGN PATENT DOCUMENTS

JP  2000-235637  8/2000
JP  2000-235638  8/2000

* cited by examiner

*Primary Examiner*—Matthew C. Bella
*Assistant Examiner*—Alex Liew
(74) *Attorney, Agent, or Firm*—Canon U.S.A. Inc., I.P. Division

(57) ABSTRACT

A method for processing images that reduces an enormous number of images down to images suitable for measuring a similarity index and that measures the similarity index between the reduced number of images more suitably. Image data and attribute information stored in an HDD are read, and an image data unit is selected as a reference on the basis of displaying data according to an image-displaying program. Then, a similarity-measuring program is activated, and the attribute information of the selected image data unit is compared with the attribute information of other image data units. An image data unit to be used for measuring the similarity index is determined, and the similarity index is measured between the selected image data unit and the determined image data units.

8 Claims, 8 Drawing Sheets

| NAME OF IMAGE DATA UNIT | SPEED | EXPOSURE | DATE | SIMILARITY INDEX |
|---|---|---|---|---|
| data042 | 1″ | 11 | 2001/12/27 09:10 | 100 |
| data001 | 1/60 | 11 | 2001/12/25 12:00 | 95.6 |
| data156 | 1/30 | 22 | 2001/12/26 23:22 | 92.0 |
| photo23 | 1/250 | 5.6 | 2001/12/26 18:56 | 42.3 |
| ⋮ | | | | |

601

METHOD AND APPARATUS FOR PROCESSING IMAGES

BACKGROUND OF THE INVENTION

1. Field of the Invention

The present invention relates to measuring a similarity index between captured images.

2. Description of the Related Art

With the widespread use of digital cameras and digital video cameras, captured static images or moving images are treated as electronic data. Further, cameras with pan heads, typified by WebView™ products, that can control moving images from remote locations or under automatic control are used.

Attribute information of captured images generally includes dates, times, shutter speeds, and exposures. In the case of controllable cameras, such information may include pan angles, tilt angles, angles of view (zoom angles), and even various control information or supplementary information (e.g. the temperature or weather conditions at capturing time).

Moreover, surveillance systems having the above-mentioned cameras are in use and may store captured images for later use. Since an enormous number of captured images is generally stored, especially in surveillance systems, it is necessary to reduce the enormous number of such images down to essential images. Hitherto, image retrieval using attribute information, such as the capture date and time, has been performed.

There are image retrieval techniques according to the similarity index between images, for example, disclosed in Japanese Patent Laid-Open Nos. 2000-235637 and 2000-235638 (hereinafter referred to as References 1 and 2, respectively). Using the similarity index between images allows, for example, retrieval of an image that is similar to a particular image or detecting a scene change in a TV program to find a part where images vary in moving images.

However, such retrieval has a problem in that a retrieved image from an enormous number of images is not always the exact image that meets the needs of searchers. In particular, measurement of the similarity index depending on captured images themselves is insufficient for accurate measurement since all capturing conditions are not considered.

Capturing with a movable camera or the like may produce images having different angles of view according to control, so that the captured images may include images that happen to show similarity, such as images whose captured objects are themselves different but have similar color or shape. Therefore, retrieval depending solely on the similarity index between images has problems.

Further, capturing with a movable camera or the like may include a case where a captured object of interest, which is specified as a rectangular region in a selected image, does not exist in other images due to the different angles of view or a case where the captured object exists at different locations in the images.

In view of these circumstances, it is an object of the present invention to provide a method for processing images that reduces an enormous number of images down to images suitable for measuring the similarity index and that measures the similarity index between the reduced number of images more effectively.

SUMMARY OF THE INVENTION

The present invention provides a method for processing images comprising the steps of obtaining image data units and attribute information thereof; selecting a first image data unit from the image data units as a reference for measuring a similarity index; comparing attribute information of the first image data unit with attribute information of the remaining image data units other than the first image data unit to determine a second image data unit to be used for measuring the similarity index; and measuring the similarity index between the first image data unit and the second image data unit.

Further objects, features and advantages of the present invention will become apparent from the following description of the preferred embodiments with reference to the attached drawings.

DESCRIPTION OF THE PREFERRED EMBODIMENTS

First Embodiment

The first embodiment of the present invention will be described below in detail.

Figure 1:
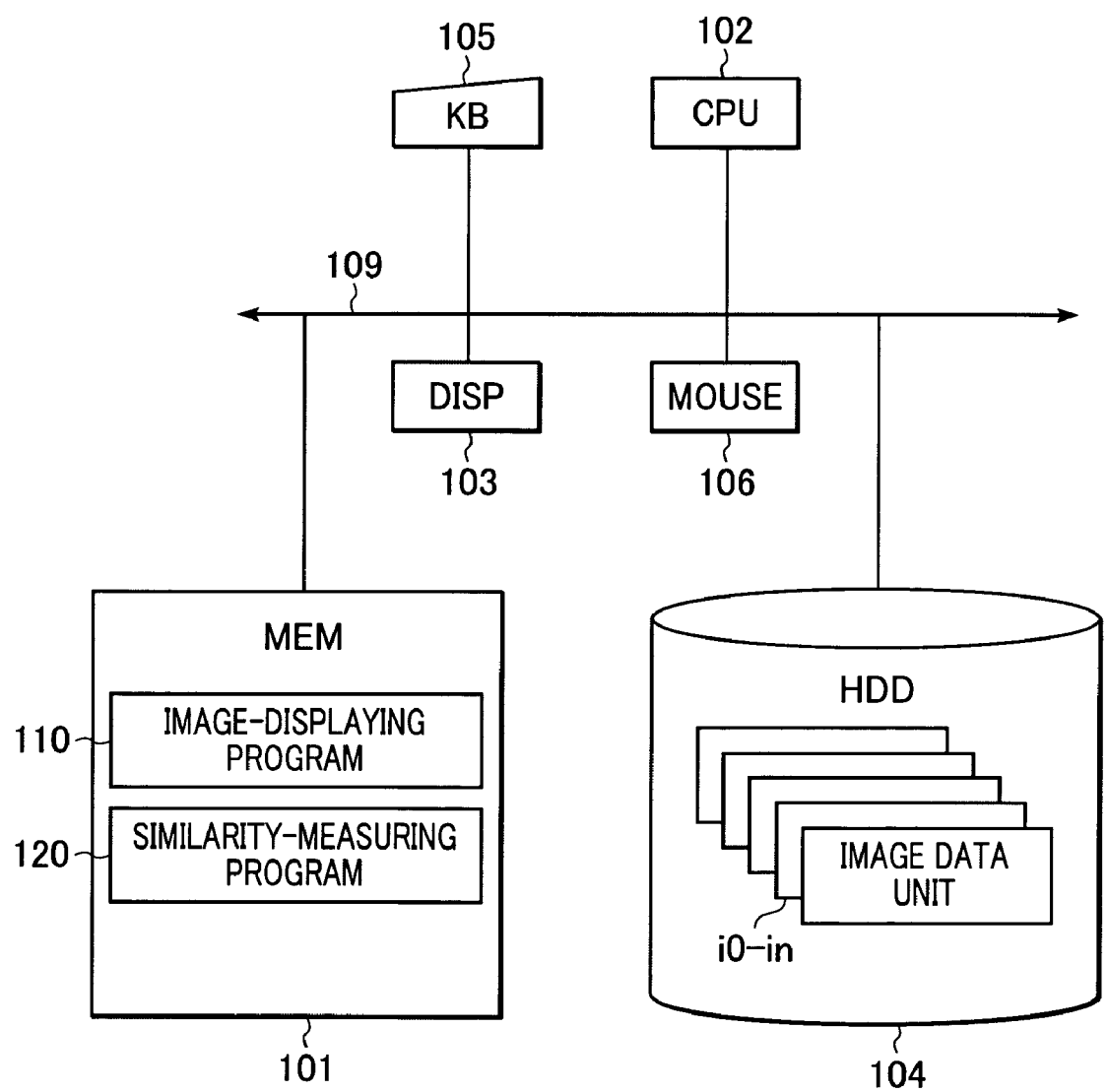
FIG. 1 is a block diagram showing a system configuration of an apparatus for processing images according to a first embodiment of the present invention.

FIG. 1 is a block diagram showing a system configuration of an apparatus for processing images according to the first embodiment of the present invention. As shown in FIG. 1, the apparatus for processing images according to this embodiment includes a memory (MEM) 101 that stores programs necessary for booting up the system or data; a central processing unit (CPU) 102 that performs computations and controls processing; a display device (DISP) 103 that displays information such as letters, symbols, or images; an auxiliary storage (HDD) 104 that stores data or information; a keyboard (KB) 105 with which a user types letters or the like; a pointing device (MOUSE) 106 by which a user selects displayed letters or images or the like with an on-screen cursor or the like; and a bus 109 that connects the above-mentioned components.

In this embodiment, the memory 101 stores an image-displaying program 110 and a similarity-measuring program 120. The auxiliary storage 104 stores n+1 image data units i0 to in.

The apparatus for processing images according to this embodiment obtains image data units and attribute information thereof and then stores them in the auxiliary storage 104, as will be described below. When an image data unit (a first image data unit) is selected as a reference for measuring of a similarity index, attribute information of the selected image data unit is compared to that of other image data units stored in the auxiliary storage 104 to exclude an image data unit that is not to be used for measuring the similarity index. In other words, attribute information of the image data unit (the first image data unit) for measuring the similarity index is compared to that of the remaining image data units other than the image data unit (the first image data unit), and an image data unit that is used for measuring the similarity index (a second image data unit) is determined. Then, the image data unit (the first image data unit) is compared to the image data unit that has not been excluded (i.e., the second image data unit that is to be used for measuring the similarity index).

Figure 2:
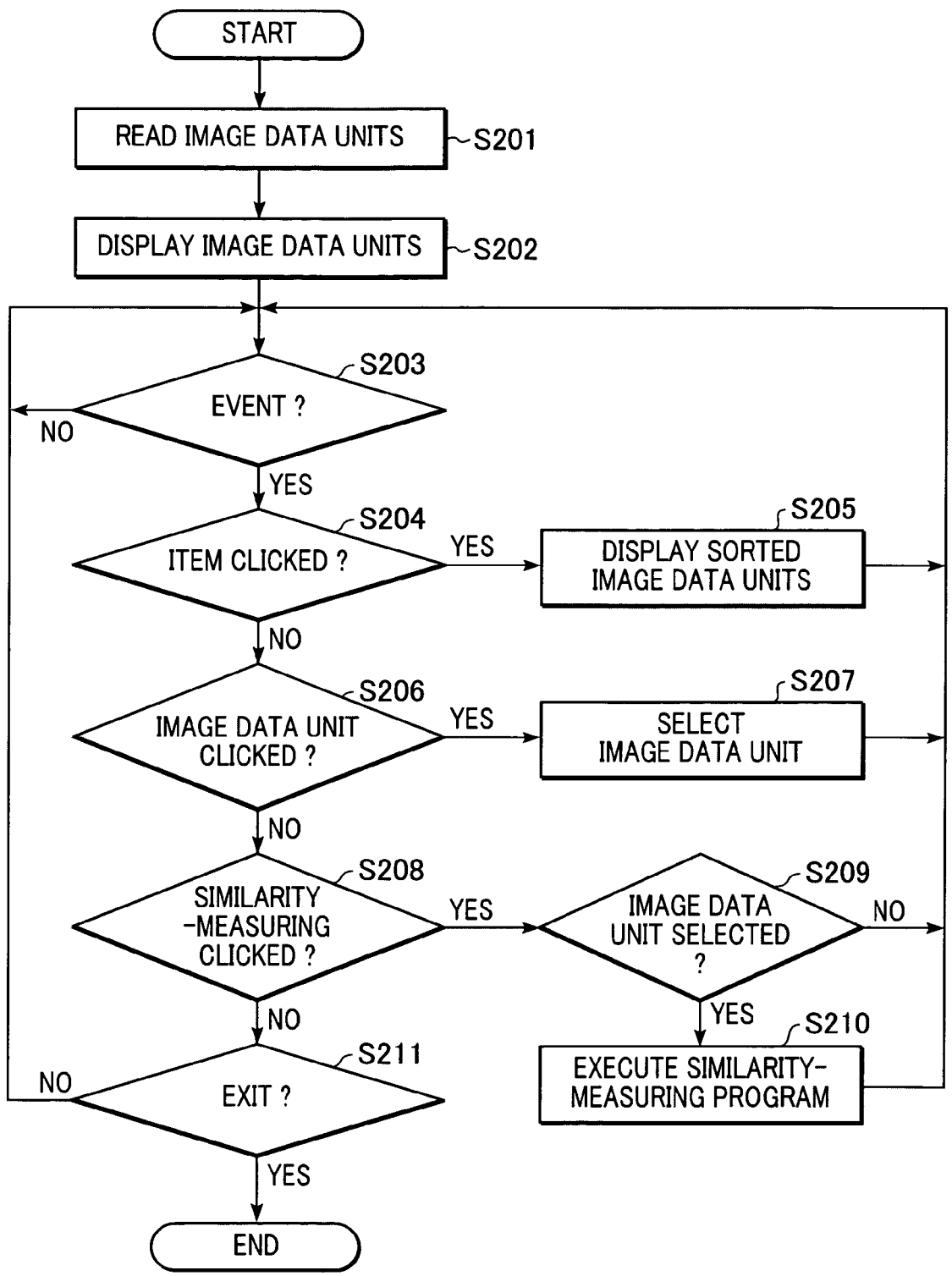
FIG. 2 is a flowchart showing an operating procedure for displaying images on the basis of an image-displaying program stored in the apparatus for processing images of the first embodiment.

The operation of the apparatus for processing images having the above-mentioned arrangement will now be described in detail. FIG. 2 is a flowchart showing an operating procedure for displaying images on the basis of the image-displaying program 110 stored in the apparatus for processing images of the first embodiment.

Firstly, the image data units i0 to in, which are stored in the auxiliary storage 104, are read (step S201). These image data units are, for example, known JPEG image data or EXIF-standard data. A header of each image data unit includes attribute values of the image. In this embodiment, such attribute values include the capture date and time, the exposure, the shutter speed, the pan angle P, the tilt angle T, and the angle of view (zoom angle) Z in each image data unit.

Figure 3:
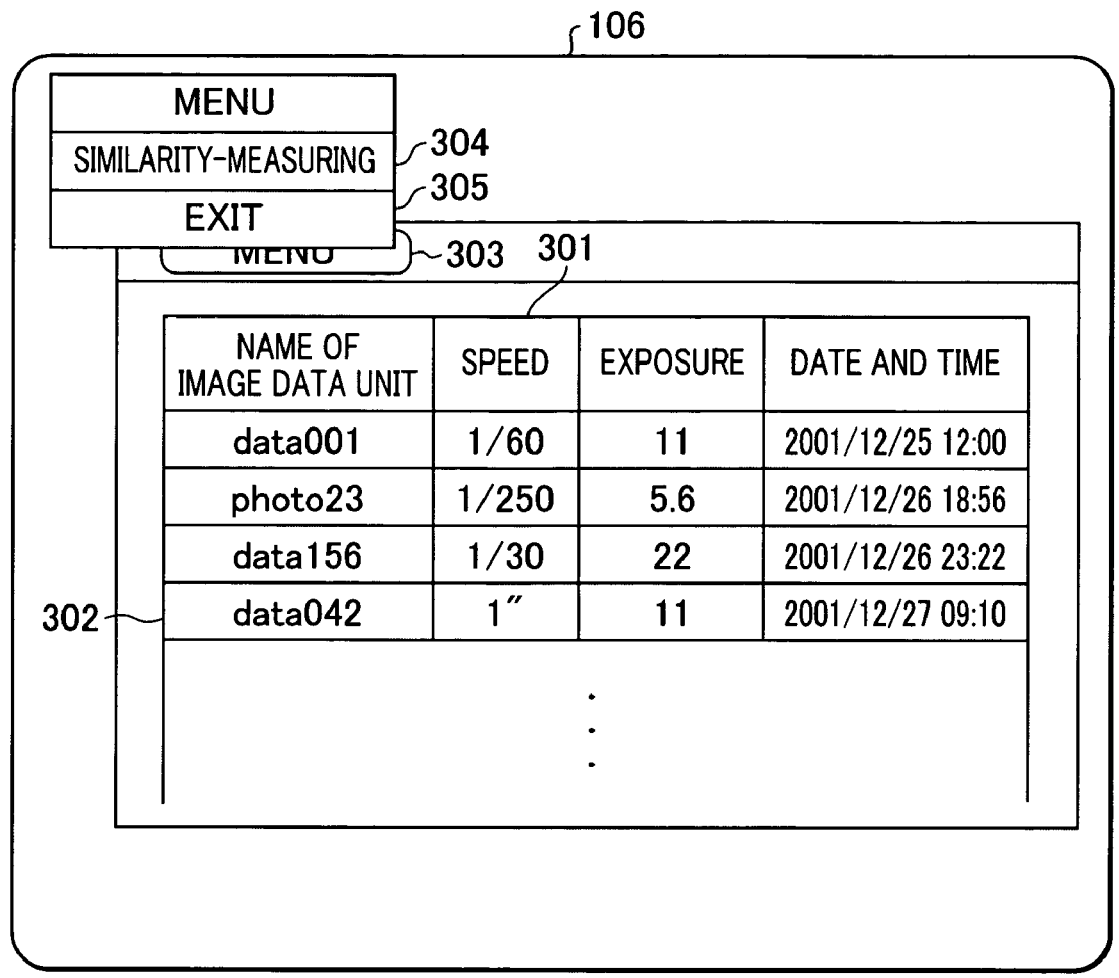
FIG. 3 illustrates a typical display of image data units read in the apparatus for processing images of the first embodiment.

Subsequently, the image data units are displayed by name, as shown in FIG. 3, after they are sorted, for example, by date and time(step S202 of FIG. 2). FIG. 3 illustrates a typical display of image data units read in the apparatus for processing images in the first embodiment. There may be cases where images themselves are displayed or both the names and the images are displayed. Then, processing waits until an event occurs (step S203).

If an event occurs by, for example, clicking a certain item such as the shutter speed designated as 301 in FIG. 3 (the YES path of step S204), the image data units are sorted and displayed according to the selected item (step S205), as performed in Windows™ Explorer.

If no item is determined to be clicked at step S204 (the NO path), it is then determined whether any of the names of the image data units, designated as 302 in FIG. 3, is clicked or not (step S206). If a name of an image data unit is clicked (the YES path), the image data unit having the clicked name is determined to be selected for measuring the similarity indices to other image data units (step S207).

If no name of an image data unit is determined to be clicked at step S206 (the NO path), it is then determined whether a similarity-measuring item 304 is clicked or not (step S208). The similarity-measuring item 304 appears in a menu displayed upon clicking a Menu button 303 shown in FIG. 3.

Then, it is determined whether any image data unit as a reference for measuring the similarity index is selected or not (step S209). If an image data unit is determined to be selected (the YES path), the similarity-measuring program 120 is performed (step S210). Subsequently, the processing goes back to step S203 and waits until the next event occurs.

If the similarity-measuring item 304 is not clicked at step S208 (the NO path), the image-displaying program 110 completes upon selecting Exit 305 (the YES path of step S211). In other cases (the NO path of step S211), the processing goes back to step S203 and waits until the next event occurs.

Figure 4:
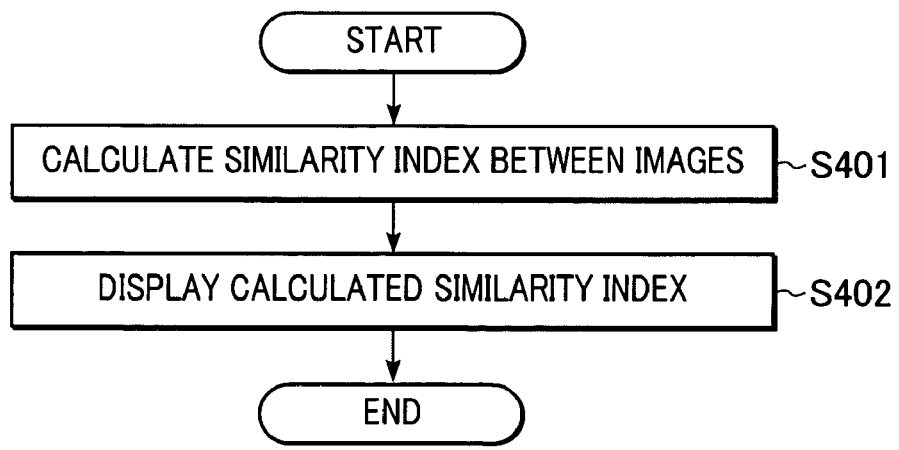
FIG. 4 is a flowchart showing a procedure for measuring a similarity index on the basis of a similarity-measuring program stored in the apparatus for processing images of the first embodiment.

The typical operation according to the similarity-measuring program 120 is as follows. FIG. 4 is a flowchart showing a procedure for measuring the similarity index on the basis of the similarity-measuring program 120 stored in the apparatus for processing images of the first embodiment.

Specifically, the calculation of the similarity indices is performed between the image selected at step S207 shown in FIG. 2 and other images stored in the auxiliary storage 104 (image-group for comparison). This calculation of the similarity index between images may use the calculation of similarity distances disclosed in References 1 and 2, but it is not restricted to this disclosed calculation algorithm.

The calculation of similarity distances according to this embodiment will now be described below.

Figures 5, 6:
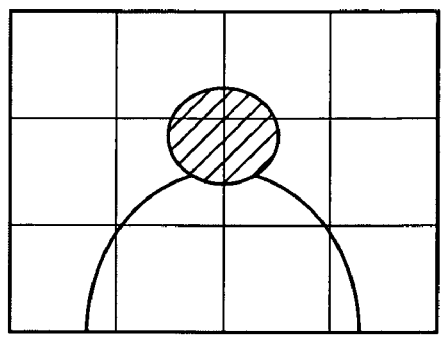
FIG. 5 schematically illustrates a typical image that is split into blocks for calculating a similarity distance in the first embodiment.
FIG. 6 illustrates a typical display of image data units sorted according to the similarity indices in the first embodiment.

Firstly, the selected image and the image-group for comparison are split into a plurality of blocks lengthwise and breadthwise, as shown in FIG. 5. Then, average values of R, G, and B channels in each block are calculated. FIG. 5 schematically illustrates a typical image that is split into blocks for calculating similarity distances in this embodiment.

Then, differences between each of the average values of R, G, and B channels of the selected image and those of the image-group for comparison are squared on a block-to-block basis, and the sum of the squared differences is determined. This is defined as the similarity distance between images, representing the similarity index. The smaller the similarity distance between images, the more similar the images; the larger the similarity distance between images, the less similar the images. In brief, this distance represents "the similarity of color arrangement between images."

The calculation of the similarity distance between images may be expressed as:

$$D = \sum_{i=1}^{k} \{(P_{1iR} - P_{2iR})^2 + (P_{1iG} - P_{2iG})^2 + (P_{1iB} - P_{2iB})^2\} \quad (1)$$

where i is a block number in processing; k is the number of blocks into which the image is split; $P_{1iR}$ is the average value of the R-channel of an ith block of a selected image; $P_{1iG}$ is the average value of the G-channel of the ith block of the selected image; $P_{1iB}$ is the average value of the B-channel of the ith block of the selected image; $P_{2iR}$ is the average value of the R-channel of the ith block of an image for comparison; $P_{2iG}$ is the average value of the G-channel of the ith block of the image for comparison; and $P_{2iB}$ is the average value of the B-channel of the ith block of the image for comparison.

The result of the calculation according to expression (1) represents information on the similarity index (or similarity distance), designated as D. If each of the average values of the R, G, and B channels is in the range, for example, 0 to 255, the information D is in the range 0 to $255^2 \times 3 \times k = 195075k$.

The similarity index S of the compared image is defined in the range of 0 to 100, as expressed by the following expression (2):

$$S = (195075k - D)/195075k * 100 \quad (2)$$

If the similarity index S is 100 in this case, the compared image is identical to the selected image. The larger the value of S, the more similar the images.

The similarity index S, which is the result of calculating the similarity index, is then stored. The similarity indices to other images for comparison are determined in the same way.

In this embodiment, pan angles, tilt angles, and angles of view (zoom angles) (hereinafter collectively referred to as PTZ) of the attribute information are compared between the selected image and other images before calculating the similarity indices. Specifically, if a pan angle Px, a tilt angle Tx, and an angle of view (a zoom angle) Zx of the selected image is different from a pan angle Py, a tilt angle Ty, and an angle of view (a zoom angle) Zy of a compared image, respectively, it is determined that the compared image is not to be used for measuring the similarity index; thus the similarity index is not calculated. In this case, the similarity index of the compared image may be assumed to be, for example, '−1'.

In this embodiment, a (second) image data unit (i.e., an image data unit that are to be used for measuring the similarity index) is not included in image data units having pan angles, tilt angles, and zoom angles of a camera during capturing the image data units, these angles being different from those included in the attribute information of a (first) image data unit (i.e., an image data unit as a reference for measuring the similarity indices to other image data units).

Additionally, the apparatus for processing images according to this embodiment, as described above, splits each of the first image data unit and the second image data unit into a plurality of blocks, and measures the similarity index between the first image data unit and the second image data unit on a block-to-block basis.

The measured similarity indices are displayed on a screen as shown in FIG. 3 (step S402). FIG. 6 illustrates a typical display of image data units sorted according to the similarity indices in the first embodiment. Referring to FIG. 6, the image data units are displayed in descending order from an image data unit having the largest similarity index (i.e., the image data that is determined to be very similar) based on the measured similarity indices 601.

Since image data units showing similarity indices of '−1' are excluded from measuring, it is possible to omit them from the screen display. This allows only image data units that are used for measuring the similarity indices to be displayed, resulting in more effective measuring of the similarity indices. When the similarity indices to all image data units to be used for measuring are calculated and then the image data units with the calculated similarity indices are displayed as illustrated in FIG. 6, the similarity-measuring program 120 exits. The mathematical expressions given above are merely examples, and the methods for measuring the similarity indices in applications of the present invention are not restricted.

The method for retrieving image data units described above allows extraction of only image data units whose capture conditions (the PTZ in this embodiment) are considered, while extraction of image data by conventional calculation of the similarity index between images may include undesired images. Therefore, even when an enormous number of image data is stored, such as when PTZ-controllable cameras are used for surveillance, the use of the apparatus for processing images according to this embodiment enables a reduction in the number of images that are used for measuring the similarity indices accurately. Attribute information other than the PTZ is applicable, as in the case of the above embodiment.

Second Embodiment

The apparatus for processing images according to the first embodiment excludes images having different angles of view during capturing to reduce the number of image data units to be used for measuring the similarity indices. In contrast to this, an apparatus for processing images according to the second embodiment further performs specifying a rectangular region having an object in which a searcher is interested when the searcher selects an image data unit for measuring the similarity indices, thereby reducing the number of image data units to be used for measuring the similarity indices.

The apparatus for processing images of this embodiment has a system configuration that is similar to that of the first embodiment except that a similarity-measuring program stored in the memory 101 shown in FIG. 1 is different.

Figure 7:
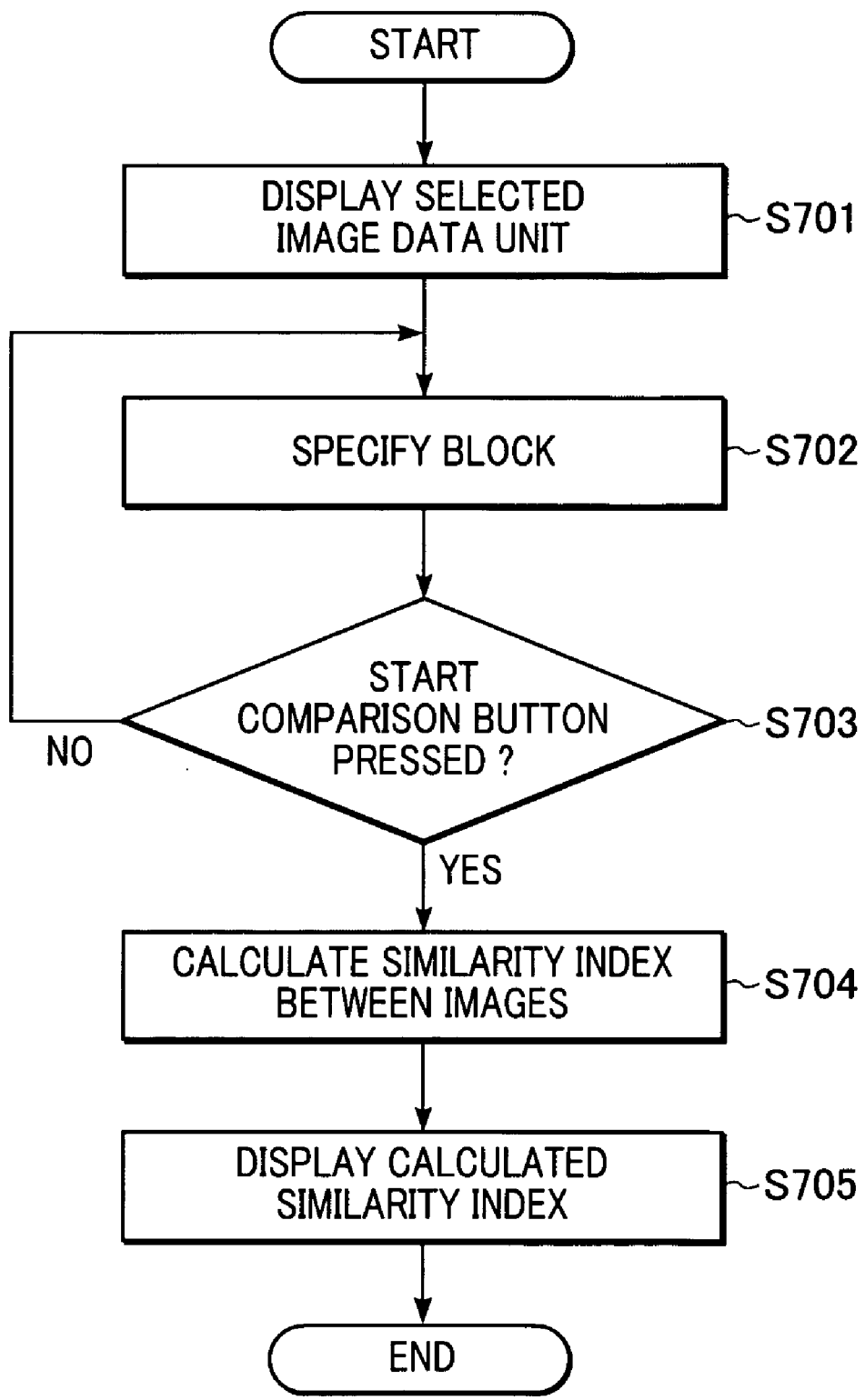
FIG. 7 is a flowchart showing a procedure for measuring a similarity index on the basis of a similarity-measuring program stored in an apparatus for processing images of a second embodiment.
Figure 8:
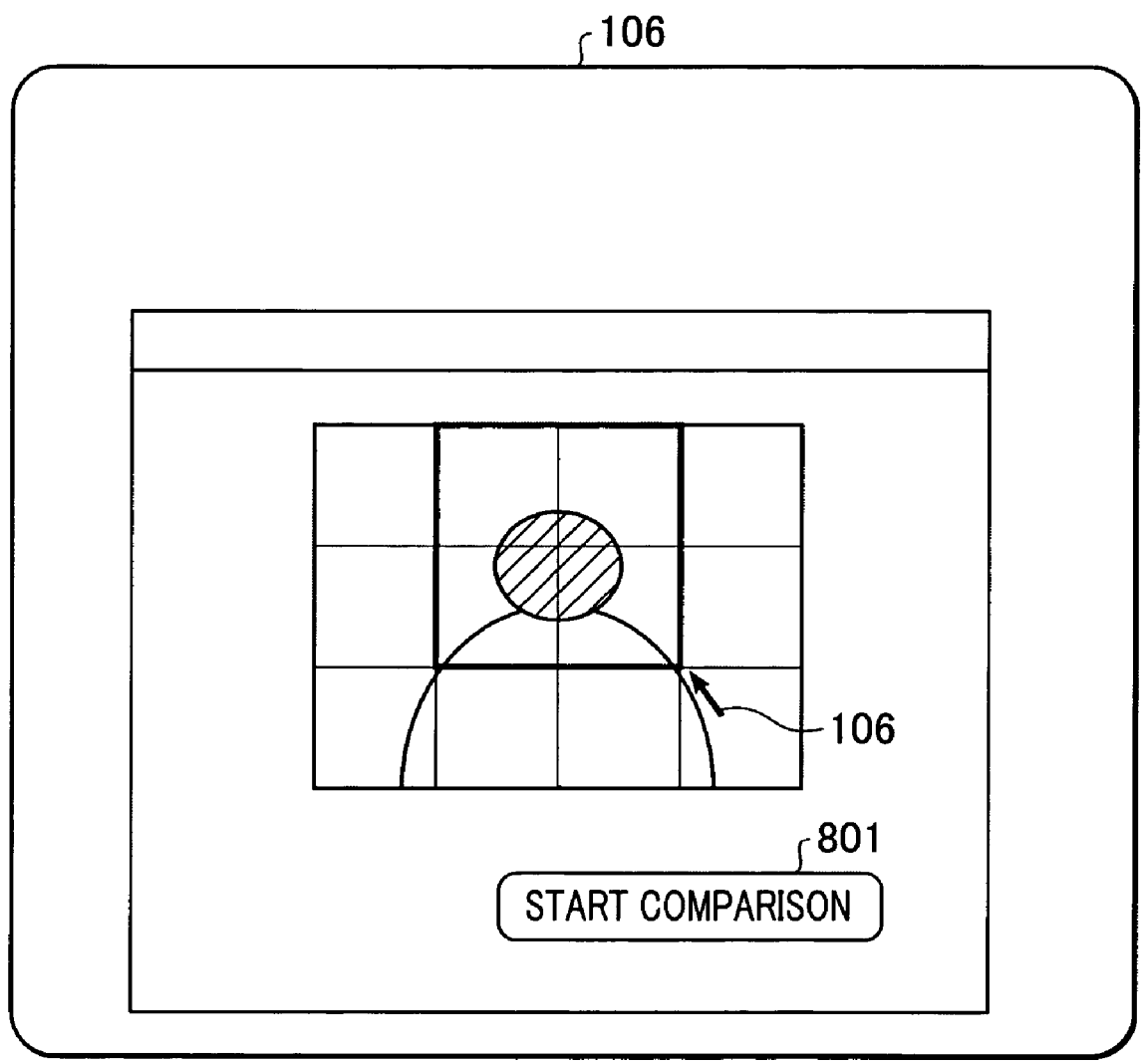
FIG. 8 schematically illustrates a typical display of an image that is split into blocks for calculating a similarity distance in the second embodiment.

The operation of the apparatus for processing images according to this embodiment will now be described in detail. The operation of displaying images according to the image-displaying program 110 is similar to that of the first embodiment. FIG. 7 is a flowchart showing a procedure for measuring the similarity index on the basis of the similarity-measuring program stored in the apparatus for processing images of the second embodiment. FIG. 8 schematically illustrates a typical display of an image that is split into blocks for calculating similarity distances in the second embodiment.

Firstly, an image selected as a reference for measuring the similarity index is displayed (step S701 of FIG. 7). As shown in FIG. 8, this displayed image has partitioning lines used for splitting the image into a plurality of blocks lengthwise and breadthwise, as with FIG. 5. At this time, a Start Comparison button 801 is disabled, for example, by being grayed out on the screen display. Then, at least one block in which the searcher is interested is clicked with the pointing device 106 or selected with rubber banding in Windows™ to specify at least one block (the rectangular region) that is used for measuring (step S702). The Start Comparison button 801 is enabled and available only after at least one block is specified.

Then, it is determined whether the Start Comparison button 801 is pressed or not (step S703). If the Start Comparison button 801 is pressed (the YES path), the similarity indices are calculated between the selected image and other images (image-group for comparison), as with step S401 of FIG. 4 showing the similarity-measuring program 120 of the first embodiment (step S704). The procedure of the similarity-measuring program of this embodiment is different from that of the first embodiments in that expression (1) applies only to at least the one block specified at step S702.

As shown in FIG. 6, image data units having the similarity indices 601 are displayed as in step S402 of FIG. 4 (step S705). As with the first embodiment, image data units having different PTZ attribute from those of the selected image are determined to be excluded from image data units to be used for measuring, so that the similarity indices thereof are not calculated. The similarity indices of such image data units may be assumed to be '−1' so that such image data units are not displayed. Upon completion of calculating the similarity indices to other image data units and displaying the image data units with the similarity indices, the similarity-measuring program according to this embodiment exits.

The apparatus for processing images according to this embodiment specifies a region for measuring the similarity index in a first image data unit (i.e., an image data unit for measuring the similarity indices to other image data units)

and measures the similarity index between the specified region in the first image data unit and the corresponding region in a second image data unit (i.e., an image data unit that is to be used for measuring the similarity indices).

Additionally, the apparatus for processing images according to this embodiment splits each of the first image data unit and the second image data unit into a plurality of blocks, and specifies at least one block to specify the region for the similarity index in the first image data unit (the image data unit for measuring the similarity indices to other image data units).

As described above, the similarity index is calculated only in the rectangular region of interest that is specified at step S702 in this embodiment. Therefore, the calculation is completed without being affected by unnecessary portions of the image data unit, resulting in a measurement of the similarity indices with higher reliability. In particular, the combined use of the PTZ and block-specifying for measuring the similarity indices in a movable and controllable camera achieves a greatly reduced number of image data units.

Third Embodiment

The apparatus for processing images according to the second embodiment specifies the rectangular region that is to be used for comparison and an image data unit having the same angle of view as the selected image data unit is used for comparison. In contrast, an apparatus for processing images according to the third embodiment performs calculations for measuring the similarity indices to regions, corresponding to the specified rectangular region in the selected image data unit, of image data units having the different angle of view as well as images having the same angle of view. This is because a specified rectangular region in an image captured with a controllable camera is relatively small for the angle of view used in capturing, and thus the corresponding region may be included in images with different angles of view.

The apparatus for processing images of this embodiment has a system configuration that is similar to that of the second embodiment except that a similarity-measuring program stored in the memory 101 shown in FIG. 1 is different.

The operation of the apparatus for processing images according to this embodiment will now be described in detail. The operation of displaying images according to the image-displaying program 110 is similar to that of the first embodiment. At step S201 of FIG. 2 showing the procedure for displaying images, images captured with different pan, tilt, and zoom operations of the camera may be read in as images having different angles of view. Examples of such images are shown as regions of angles of view 901, 903, or 904 in FIG. 9, which will be described below. The similarity-measuring program of this embodiment is similar to that of the second embodiment except that a calculation for measuring the similarity indices between images described at step S704 of the flowchart of FIG. 7 is different.

Specifically, according to the similarity-measuring program of this embodiment, an image including a rectangular region corresponding to a specified rectangular region in the selected image for measuring the similarity index is to be comparison with, and the corresponding rectangular region is extracted and is compared with the specified rectangular region. Accordingly, an image having no corresponding rectangular region is excluded from the comparison, and it is assumed to be, for example, '−1' to be not displayed.

Figure 9:
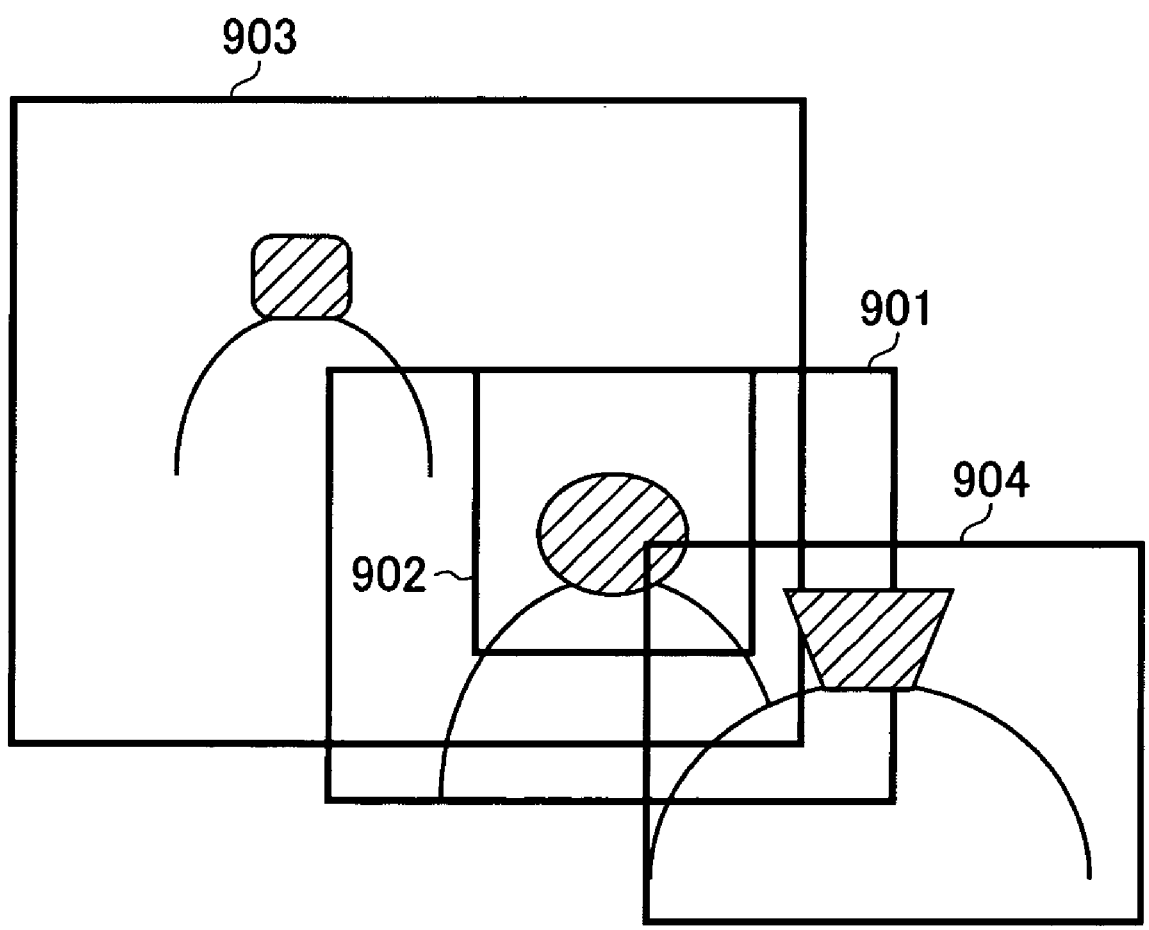
FIG. 9 schematically illustrates an example showing a specified rectangular region in a selected image and the corresponding rectangular region in an image to be compared with in a third embodiment.

FIG. 9 schematically illustrates an example showing the specified rectangular region in the selected image and the corresponding rectangular region in the image to be compared with in the third embodiment. Referring to FIG. 9, the region 901 represents the angle of view of the selected image, a region 902 represents the specified rectangular region, and the region 903 represents the angle of view of a candidate image for comparison. In this case, since the region 903 includes a region corresponding to the specified rectangular region 902, the corresponding region is to be compared with. This corresponding region is shown as a rectangular region 902' in FIG. 10, which will be described below.

Referring to FIG. 9, the region 904 represents the angle of view of another candidate image for comparison. In this case, since the region 904 does not include a region corresponding to the specified rectangular region 902, this candidate image is excluded from the comparison. Such a determination of whether a region is used for comparison or not is achieved by, for example, applying the coordinate axes to the whole effective region captured under control of pan, tilt, and zoom operations of the camera. In other words, the angles of view of candidate images are expressed with the absolute coordinates so that the determination of whether the candidate images include the entire specified rectangular region 902 or not can be performed by comparing the coordinates of the images. Specifically, where any point in the upper-left part of the screen display has coordinate (0, 0), the rectangular region 902 can be represented as (X1, Y1)-(X2, Y2) and the region 903 can be represented as (X3, Y3)-(X4, Y4). If X1>=X3, X2=<X4, Y1>=Y3, and Y2=<Y4, the region 903 is determined to be used for comparison.

Figure 10:
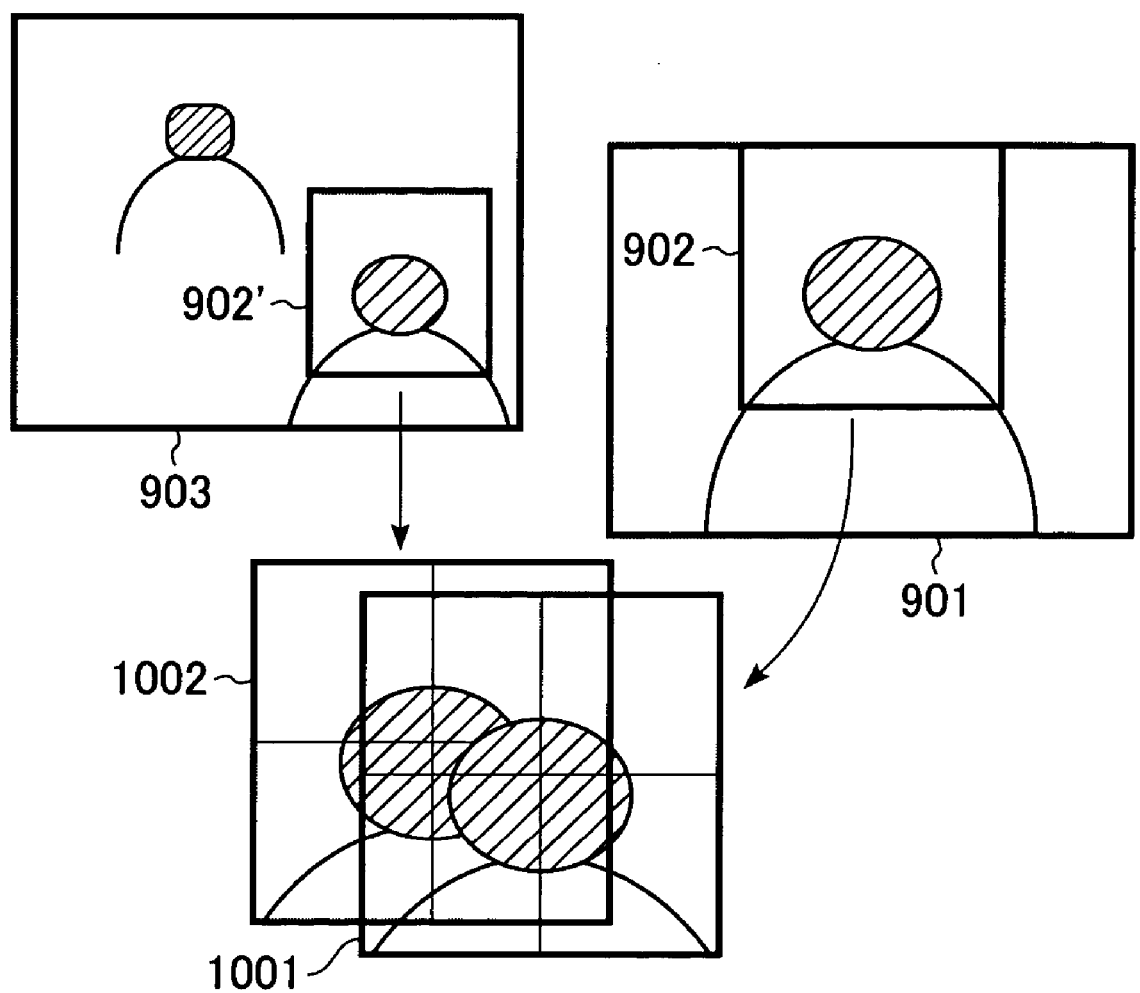
FIG. 10 illustrates a typical measurement of a similarity index between the specified rectangular region in the selected image and the corresponding rectangular region in the image to be compared with in the third embodiment.

FIG. 10 illustrates a typical measurement of the similarity index between the specified rectangular region in the selected image and the corresponding rectangular region in the image that is to be used for comparison in the third embodiment. Specifically, the similarity index is measured between an image 1001, which is extracted with the specified rectangular region 902 of the region 901 of the selected image, and the corresponding rectangular region in the image that is used for comparison. An image 1002 is a rectangular image prepared by, for example, a typical scaling of an image that is extracted with the region 902' so as to be used for measuring the similarity index to the image 1001.

In the apparatus for processing images according to this embodiment, image data units are obtained and stored in the auxiliary storage. A first image data unit is selected as a reference for measuring a similarity index and a region for measuring the similarity index in the first image data unit is specified. A region in a second image data unit is extracted from the remaining image data units other than the first image data and the specified region in the first image data unit. The region in the second image data unit corresponds to the specified region. Then, the similarity index is measured between the specified region in the first image data unit and the extracted corresponding region in the second image data unit.

As described above, comparison between the rectangular regions allows measurement of the similarity indices to images stored as different images, images captured at different locations, or images having different angles of view.

As described above, the similarity index is calculated between the specified rectangular region in the selected image and the corresponding region in the image that is used for comparison, allowing extraction of similar images to be restricted to a desired region in this embodiment.

Other Embodiments

The present invention is applicable to a system consisting of a plurality of devices, such as a host computer, an interface device, a reader, or a printer, or to an apparatus consisting of a single device, such as a copying machine, or a facsimile machine.

The object according to the present invention can be achieved by providing a system or an apparatus with a recording medium (or a storage medium) on which program code for software achieving functions of the above described embodiments is recorded, wherein a computer (a CPU or an MPU) reads the program code stored on the recording medium and executes it. In this case, the program code read from the recording medium itself carries out the functions of the above described embodiments, so that the recording medium recording the program code is included in the present invention. Further, it is apparent that the functions of the above described embodiments can be carried out not only where the computer executes the read program code, but also where an operating system (OS) running on the computer executes a part of or all of actual processing on the basis of the program code instructions.

Moreover, it is apparent that the functions of the above described embodiments can be carried out where the program code read from the recording medium is written in memory included in an extension card inserted into the computer or an extension unit connected to the computer, and then a CPU or the like included in the extension card or the extension unit executes a part of or all of actual processing on the basis of the program code instructions.

When the present invention is applied to the above mentioned recording medium, the recording medium stores program code corresponding to the procedures described in the above embodiments. As described above, the present invention reduces the enormous number of images down to images suitable for measuring the similarity indices and measures the similarity indices between the selected images more suitably.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for processing images comprising the steps of:
   obtaining image data units;
   selecting a first image data unit as a reference for measuring a similarity index;
   specifying a region for measuring the similarity index in the first image data unit;
   determining, among attribute information of remaining image data units other than the first image data unit, whether attribute information in terms of pan angles, tilt angles, and zoom angles of a camera being used during capturing the remaining image data units is identical to the attribute information of the first image data unit in terms of pan angles, tilt angles, and zoom angles of a camera being used during capturing the first image data unit;
   deciding, among remaining image data units other than the first image data unit, images having the attribute information identical to the attribute information of the first image data units determined, as a second image data unit to be compared with the first image data unit in the measuring similarity index;
   specifying a corresponding region in the second image data unit corresponding to the specified region in the first image data unit; and
   measuring the similarity index between the specified region in the first image data unit and the specified corresponding region in the second image data unit.

2. A method for processing images according to claim 1, further comprising the steps of:
   splitting each of the first image data unit and the second image data unit into a plurality of blocks; and
   measuring the similarity index between the first image data unit and the second image data unit on a block-to-block basis.

3. A method for processing images according to claim 1, further comprising the steps of:
   splitting each of the first image data unit and the second image data unit into a plurality of blocks; and
   specifying at least one block to specify the region in the first image data unit.

4. An apparatus for processing images comprising: obtaining means for obtaining image data units;
   selecting means for selecting a first image data unit as a reference for measuring similarity index;
   first specifying means for specifying a region for measuring the similarity index in the selected image data unit;
   determining means for determining, among attribute information of remaining image data units other than the first data unit, whether attribute information in terms of pan angles, tilt angles, and zoom angles of a camera being used during capturing the remaining image data units is identical to the attribute information of the first image data in terms of pan angles, tilt angles, and zoom angles of a camera being used during capturing the first image data units;
   deciding means for deciding, among remaining image data units other than the first image data unit, images having the attribute information identical to the attribute information of the first image data units determined by the determining means, as a second image data unit to be compared with the first image data unit in the measuring similarity index;
   second specifying means for specifying a corresponding region in the image data unit corresponding to the specified region in the selected image data unit; and
   similarity-measuring means for measuring the similarity index between the specified region in the first image data unit and the specified corresponding region in the second image data unit.

5. An apparatus for processing images according to claim 4 further comprising splitting means for splitting the image data units into a plurality of blocks,
   wherein the similarity-measuring means measures the similarity index between the image data unit selected by the selecting means and an image data unit that is stored in the image-storing means and that is not excluded by the excluding means.

6. An apparatus for processing images according to claim 4 further comprising splitting means for splitting the image data units into a plurality of blocks,
   wherein the region-specifying means specifies at least one block to specify the region in the image data unit for measuring the similarity index.

7. A computer-readable program medium having stored thereon computer-executable instructions for performing a method for processing images comprising:
   obtaining image data units;
   selecting a first image data unit as a reference for measuring a similarity index; specifying a region for measuring the similarity index in the first image data unit; determining, among attribute information of remaining image data units other than the first image data unit, whether attribute information in terms of pan angles, tilt angles, and zoom angles of a camera being used during capturing the remaining image data units is identical to the attribute information of the first image data unit in terms of pan angles, tilt angles, and zoom angles of a camera being used during capturing the first image data unit;

deciding, among remaining image data units other than the first image data unit, images having the attribute information identical to the attribute information of the first image data units determined, as a second image data unit to be compared with the first image data unit in the measuring similarity index; specifying a corresponding region in the second image data unit corresponding to the specified region in the first image data unit; and measuring the similarity index between the specified region in the first image data unit and the specified corresponding region in the second image data unit.

8. A computer program stored on a computer-readable medium, the computer program having computer-executable instructions for performing a method for processing images comprising:

obtaining image data units;

selecting a first image data unit as a reference for measuring a similarity index;

specifying a region for measuring the similarity index in the first image data unit;

determining, among attribute information of remaining image data units other than the first image data unit, whether attribute information in terms of pan angles, tilt angles, and zoom angles of a camera being used during capturing the remaining image data units is identical to the attribute information of the first image data unit in terms of pan angles, tilt angles, and zoom angles of a camera being used during capturing the first image data unit;

deciding, among remaining image data units other than the first image data unit, images having the attribute information identical to the attribute information of the first image data units determined, as a second image data unit to be compared with the first image data unit in the measuring similarity index;

specifying a corresponding region in the second image data unit corresponding to the specified region in the first image data unit; and measuring the similarity index between the specified region in the first image data unit and the specified corresponding region in the second image data unit.

\* \* \* \* \*